United States Patent
Wysong

(10) Patent No.: US 6,666,627 B1
(45) Date of Patent: Dec. 23, 2003

(54) DISCHARGE APPARATUS ADAPTED TO DISTRIBUTE MATERIAL

(75) Inventor: Douglas E. Wysong, Camden, OH (US)

(73) Assignee: Finn Corporation, Fairfield, OH (US)

( * ) Notice: Subject to any disclaimer, the term of this patent is extended or adjusted under 35 U.S.C. 154(b) by 0 days.

(21) Appl. No.: 09/578,782

(22) Filed: May 25, 2000

(51) Int. Cl.$^7$ .................. B65G 53/58; A01D 87/10
(52) U.S. Cl. ................. 406/98; 406/102; 406/109; 406/192; 222/368; 222/637; 222/630
(58) Field of Search ............... 406/98, 102, 109, 406/130, 192; 222/251, 630, 639, 368; 414/217–221

(56) References Cited

U.S. PATENT DOCUMENTS

| | | | |
|---|---|---|---|
| 2,681,748 A | * 6/1954 | Weller ................ 406/67 |
| 3,151,784 A | * 10/1964 | Tailor ................ 222/368 |
| 3,403,942 A | 10/1968 | Farnworth | |
| 4,465,239 A | * 8/1984 | Woten ................ 241/159 |
| 4,479,591 A | * 10/1984 | Burkhart et al. ........ 222/317 |
| 4,695,206 A | * 9/1987 | Hansen ............... 406/65 |
| 4,852,809 A | * 8/1989 | Davis et al. .......... 239/654 |
| 5,181,804 A | 1/1993 | Wysong et al. | |
| 5,299,888 A | 4/1994 | Wysong et al. | |
| 5,556,237 A | 9/1996 | Rexius | |
| 5,575,595 A | * 11/1996 | Smoot ................ 406/118 |
| 5,676,281 A | * 10/1997 | Reier ................ 222/195 |
| 5,725,160 A | 3/1998 | Harper et al. | |
| 5,725,332 A | 3/1998 | Harper et al. | |
| 5,755,837 A | * 5/1998 | Beierle et al. ......... 202/262 |
| 5,806,531 A | * 9/1998 | Diehl et al. .......... 131/108 |
| 5,813,801 A | * 9/1998 | Newbolt et al. ........ 406/14 |

FOREIGN PATENT DOCUMENTS

DE 23 63 505 A 7/1975

OTHER PUBLICATIONS

Pressure Drop Across a Pneumatic Conveying Feeding Tee; Pneumatic Conveying, vol. 5, No. 1; pp. 27–30; Mar. 1993.

* cited by examiner

Primary Examiner—Donald P. Walsh
Assistant Examiner—Jeffrey A. Shapiro
(74) Attorney, Agent, or Firm—Dinsmore & Shohl LLP

(57) ABSTRACT

A discharge apparatus for connection to and covering an airlock material outlet. The discharge apparatus includes an air inlet for at least substantially directing an airstream through an airlock material outlet and toward an interior area defined by an airlock. The discharge apparatus further includes a material directing trough for receiving an airstream and bulk material entrained therein from the airlock. The discharge apparatus also includes an extension member adapted to at least partially define a path of an airstream.

31 Claims, 11 Drawing Sheets

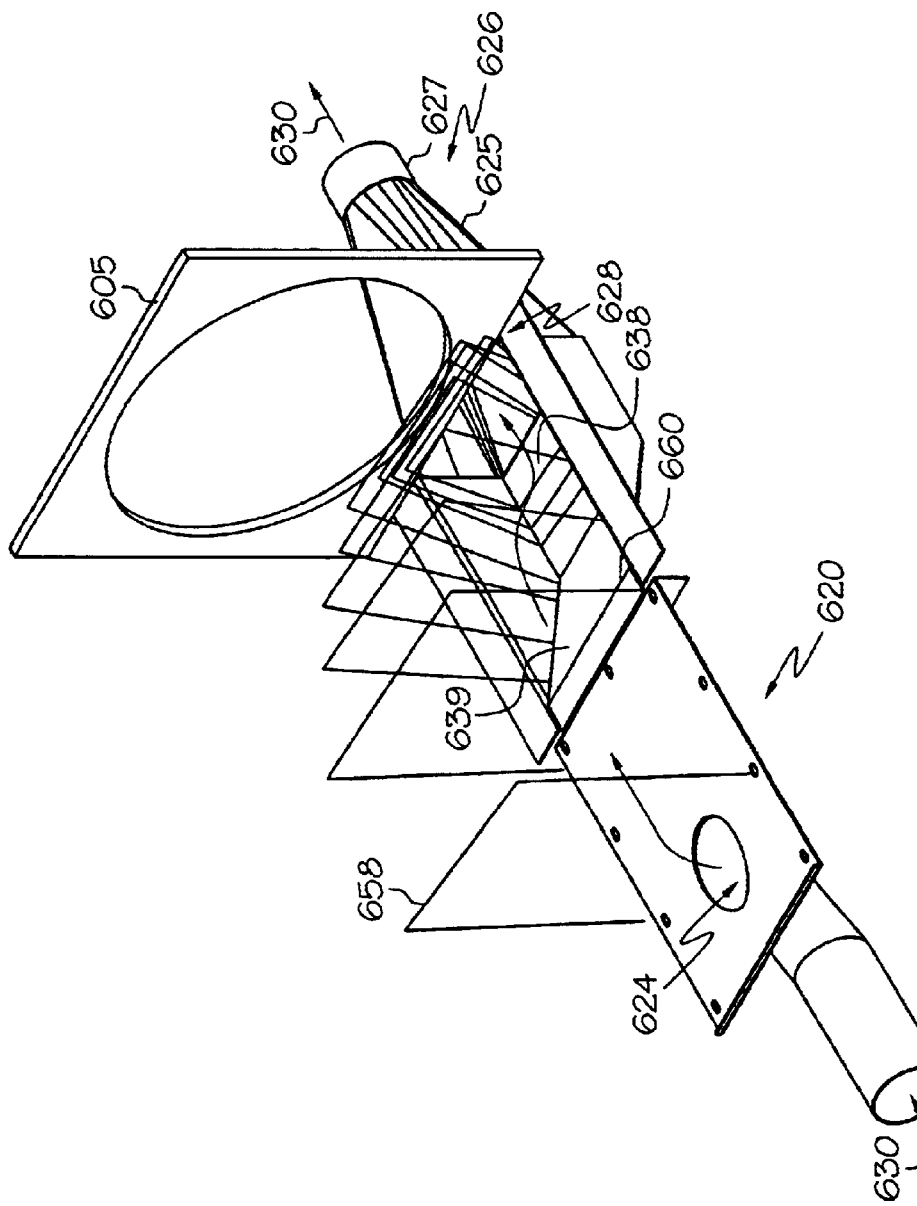

DISCHARGE APPARATUS ADAPTED TO DISTRIBUTE MATERIAL

TECHNICAL FIELD

This invention relates generally to apparatus for material distribution, and more particularly to a discharge apparatus for use in an airlock discharge assembly. The invention further relates to an airlock discharge assembly including an improved discharge apparatus.

BACKGROUND OF THE INVENTION

Conventional airlock discharge assemblies are currently used for discharging bulk material from a bulk material discharge assembly. The airlock discharge assemblies frequently entrain the bulk material in a fluid such as air for distribution.

FIG. 1 illustrates one conventional airlock discharge assembly 100 including an airlock 102 and a discharge apparatus 120. The airlock 102 includes a rotor 103 for rotation inside a housing 105. The rotor 103 comprises an axle 104 having an axis 107, a hub 106 mounted on the axle 104, and vane blades 108 attached at a proximal end to the hub 106. Typically, the airlock 102 is provided with a plurality of vane blades 108. Bulk material conveying areas are typically defined between at least a pair of adjacent vane blades 108, an exterior surface of the hub 106 disposed between the proximal ends of the vane blades 108, an interior surface of the housing 105 extending between the distal ends of the vane blades 108, and side portions of the housing 105 adjacent the lateral edges of the vane blades 108.

In use, bulk material enters an airlock material inlet 112 and fills exposed bulk material conveying area(s). The rotor 103 continues to rotate about the axis 107 until the lateral sides of the bulk material conveying area(s) are registered with the an air inlet 124 and an air outlet 128 defined by the discharge apparatus 120. An airstream 130 passes through an inlet conduit 122 and an air inlet 124 defined by the inlet conduit 122 in fluid communication with an aperture formed in a side of the housing 105. The airstream 130 is directed by the air inlet 124 in a direction substantially parallel to the axis 107 and directly into one or more bulk material conveying area(s) from a lateral side of the bulk material conveying area(s). The bulk material is then entrained with the airstream 130 and thereafter discharged through an air outlet 128 defined by an outlet conduit 126 in fluid communication with an aperture formed in the opposite side of the housing 105. The bulk material is discharged with the airstream 130 through the outlet conduit 126 until it is distributed to the surrounding environment.

The airlock discharge assembly 100 has the benefit of providing a high level of cross-sectional area control, allowing the use of high velocities with a minimal amount of air flow. However, the end portions of the bulk material conveying areas must be kept open since the airstream 130 is required to laterally pass through the bulk material conveying areas. This arrangement typically causes sealing problems between the discharge apparatus 120 and the airlock 102. In addition, the vane blades 108 of the rotor 103 are exposed to high stresses when shearing objects lodged in the air inlet 124 more frequently in the air outlet 128, and at the edge of the material inlet 112. The airlock discharge assembly 100 also experiences excessive wear at the air outlet 128 as entrained bulk material traveling at a high velocity interferes with the housing 105 and other portions of the airlock discharge assembly 100.

FIG. 2 illustrates another conventional airlock discharge assembly 200 wherein an air inlet 224 directs an inlet airstream 230 below a conventional airlock 202, rather than directly through a side of the housing 205 and a lateral side of the bulk material conveying areas as with the airlock discharge assembly 100. The airlock 202 comprises rotor 203 including an axle 204 having an axis 207, a hub 206 mounted on the axle 204, and a plurality of vane blades 208 radially extending from an exterior surface of the hub 206. Bulk receiving areas may be defined between two adjacent vane blades 208, a portion of the outer surface of the hub 206 disposed between proximal ends of the vane blades 208, side portions of the housing 205 adjacent the lateral edges of the vane blades 208, and a portion of the interior surface of the housing 205 extending between the distal ends of the vane blades 208.

In use, bulk material enters through an airlock material inlet 212 and is received by exposed bulk material conveying area(s). As shown in FIG. 2, an airlock material outlet 210 is positioned below a bottom edge position 209 of the vane blades 208. As the bulk material conveying areas register with the airlock material outlet 210, the bulk material falls out of the registered conveying areas and is entrained with the airstream 230. FIG. 2 further illustrates a conventional discharge apparatus 220 extending below the airlock 202. In particular, an intermediate conduit 225 extends below and is attached to the airlock 202. The airstream 230 passes through an inlet conduit 222 and through an air inlet 224. The air inlet 224 directs the airstream 230 in a direction substantially parallel with the axis 207 of the axle 204. The air inlet 224 does not direct the inlet airstream 230 into the airlock material outlet 210 and also does not direct the inlet airstream 230 in a direction toward an area (e.g., a bulk receiving area) defined by the airlock 202. At most, after the airstream 230 passes through the air inlet 224, a portion of the inlet airstream 230 may defuse up into the airlock material outlet 210 wherein bulk material is entrained in the airstream 230, after which the airstream 230 directs the material through the air outlet 228 and into the outlet conduit 226 for discharging.

However, material tends to accumulate in stagnant spaces of the airlock discharge assembly 200 in use. Material also tends to accumulate between the air inlet and outlet, particularly at a point approximately ⅔ of the overall length from the air inlet 224. Material build up of this manner is discussed in "Pressure Drop Across a Pneumatic Conveying Feeding Tee", *Pneumatic Conveying*, by H. H. Ottermann and S. J. Meijers, Vol.5, No.1, (March, 1993) pp.27–30.

FIG. 3 illustrates yet another conventional airlock discharge assembly 300 including an airlock 302 having a rotor 303. The rotor 303 comprises an axle 304 with an axis 307. A hub 306 is mounted to the axle 304 for rotation therewith and vane blades 308 are attached to an outer surface of the hub 306 and extend radially therefrom. Bulk material areas are defined between adjacent vane blades 308, a portion of the outer surface of the hub 306 extending between proximate ends of the blade vanes 308, an interior surface of the housing 305 extending between distal ends of the vane blades 308 and side portions of the housing 305 extending between lateral sides of the vanes 308. As further shown in FIG. 3, a conventional discharge apparatus 320 is provided for discharging bulk material from the bulk material conveying areas. As also shown in FIG. 3, an air inlet 324 is provided in a side wall of the housing 305 allowing an airstream 330 to be directly injected into the bulk material conveying areas between the vane blades 308 similar to the embodiment described previously in FIG. 1.

In use, bulk material enters the airlock discharge assembly 300 through an airlock material inlet 312 and is received into exposed bulk material conveying area(s). The rotor 303 continues to rotate until the bulk material conveying area(s) are registered with the air inlet 324 and the air outlet 328. An air inlet stream 330 passes through the inlet conduit 322 attached to the sidewall of the housing 305 and is directed substantially parallel to the axis 307 of the axle 304 and directly into one or more bulk material conveying area(s) from a lateral side of the bulk material conveying area(s). Bulk material is entrained into the airstream 330 and then exits through an air outlet 328 provided in a bottom wall of the housing 305. It is also known to install a circular knife at the air outlet 328 for wear resistance. The bulk material is then discharged with the airstream 330 through an outlet conduit 326.

The arrangement of components in the airlock discharge assembly 300, however, still causes high stress in the vane blades 308 when objects become lodged in the air outlet 328. Moreover, uneven wear of the vane blades 308 at the distal ends occur. Higher blade wear is typical at the distal ends of the vane blades 308 which pass over the air outlet 328.

SUMMARY OF THE INVENTION

Accordingly, it is an object of the present invention to obviate problems and shortcomings of conventional airlock discharge assemblies. More particularly, it is an object of the present invention to provide airlock discharge assemblies capable of discharging bulk material from an airlock.

Other objects of the invention are to reduce wear and friction on an airlock discharge assembly, and/or to maximize air velocities so that the airflow may impart energy more efficiently to bulk material in an airlock discharge assembly for any given amount of airflow.

Another object of the invention is to provide an airlock discharge assembly adapted to substantially prevent accumulation of portions of bulk material as the material is conveyed through the airlock discharge assembly.

To achieve the foregoing and other objects in accordance with the present invention, discharge apparatus are provided in order to connect to and cover an airlock material outlet. The discharge apparatus include an air inlet adapted to at least substantially direct an airstream through an airlock material outlet and toward an interior area defined by the airlock. The discharge apparatus further include a material directing trough adapted to receive an airstream and bulk material entrained therein from the airlock, and an extension member adapted to at least partially define a path of an airstream.

To further achieve the foregoing and other objects and in accordance with the present invention, an airlock discharge assembly is provided and includes a rotary airlock. The rotary airlock includes a housing having a bulk material inlet and a bulk material outlet. The rotary airlock further includes a central axle within the housing and a plurality of vanes extending in a direction generally away from the central axle wherein adjacent vanes define bulk material conveying areas within the housing. An air inlet is in communication with the housing and is adapted to at least substantially direct an airstream in a direction nonparallel to the axle and toward a bulk material conveying area in communication with the bulk material outlet.

Still other objects and advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 7a is a perspective view of a discharge apparatus of the airlock discharge assembly as shown in FIG. 6 illustrating the path of the airstream;

DETAILED DESCRIPTION

Figure 8:
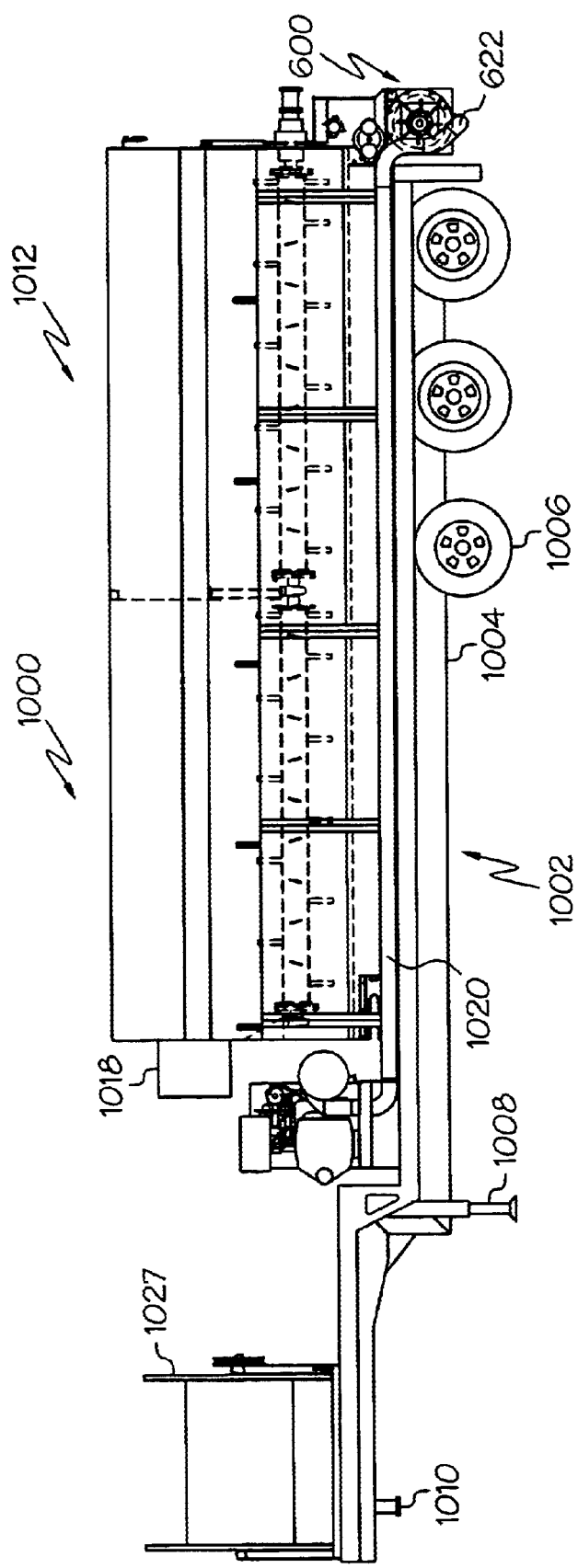
FIG. 8 illustrates a side elevational view of a bulk material discharge assembly in accordance with the present invention.

FIG. 8 illustrates a side elevational view of a bulk material discharge assembly 1000 in accordance with the present invention. The bulk material discharge assembly 1000 may be mounted on a support surface such as a pallet or stand for elevating the assembly 1000, on a foundation (e.g., a concrete foundation), or directly on a ground surface.

As shown in FIG. 8, the bulk material discharge assembly 1000 may also be installed on a trailer 1002 or other transportation device for mobility. In one example, a trailer 1002 may include a chassis 1004 having wheels 1006 for transporting the bulk material discharge assembly 1000. The trailer 1002 may further include a jack or elevation device 1008 for adjusting the orientation of the bulk material discharge assembly 1000, or for supporting the trailer 1002 at a desired discharging location and/or orientation. For instance, the jack 1008 may be used to maintain the bulk material discharge assembly 1000 in a substantially horizontal orientation regardless of any irregular surfaces that the trailer is supported on. In addition, the jack 1008 may be extended to elevate the forward portion of the trailer, thereby tipping the bulk material discharge assembly 1000 such that bulk material is encouraged to travel to the rear portion 1028 of a hopper 1012 for distribution.

Figure 9:
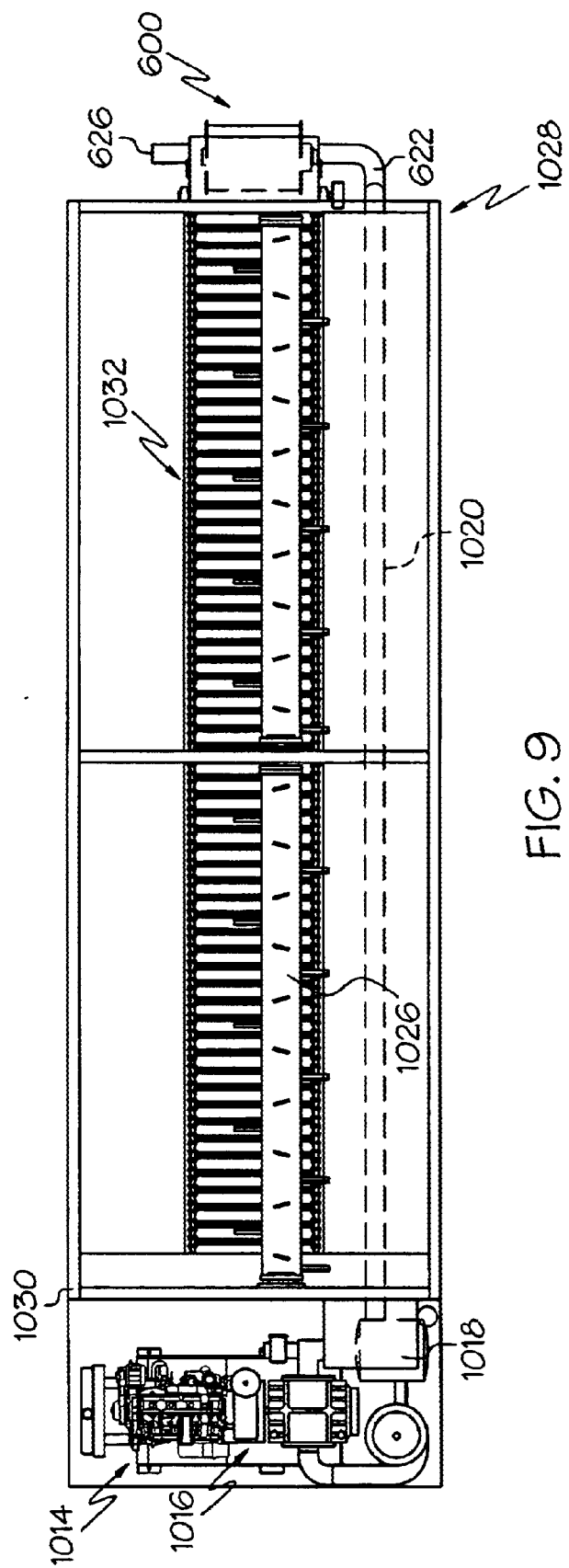
FIG. 9 illustrates a partial top plan view of the bulk material discharge assembly of FIG. 8 in accordance with the present invention.

The trailer 1002 may further include a kingpin 1010, thereby allowing the trailer 1002 to be transported via a truck (not shown). The bulk material discharge assembly 1000 may include a hopper 1012 for containing bulk materials (not shown) and an engine 1014 (as shown in FIG. 9), for powering a blower 1016 and a hydraulic pump.

In use, the blower 1016 forces air through conduit 1020, through an inlet conduit 622, and into an airlock discharge assembly, for example, airlock discharge assembly 600 as shown in FIG. 8. Bulk material is then entrained into the airstream and thereafter forced through the outlet conduit, for example, outlet conduit 626 as shown in FIGS. 9 and 10.

Entrained, throughout this application, is intended to mean mixing any material in another flowing material to form a heterogeneous or homogeneous mixture. Bulk material may include any material that may be entrained in a flowing material for distribution. For instance, bulk material may comprise composts, chipped woods, chipped barks, mulches, seeds, grains, hays, fertilizers, sands, soils, herbicides, pesticides (e.g., insecticides), plastic pellets, salts or the like. The bulk material may be mixed with other solids and/or liquids prior to, during, and/or after entraining with the flowing material. For instance, mulch may be treated with water before, during and/or after entraining in order to prevent significant diffusing of the mulch into the atmosphere, thereby more efficiently and effectively placing material on a surface in the desired distribution area. In one particular application, a highly pulverized, fine wood mulch material commonly referred to as "black gold" is entrained with air by an airlock discharge assembly and thereafter distributed around trees, bushes, or other landscape terrain. In another example, seed may be mixed with compost and/or fertilizer to encourage seedling growth. In another application, the bulk material may be mixed with solid/liquid herbicides and/or pesticides to deter weed growth and/or protect living organisms (e.g., plants).

Figure 10:
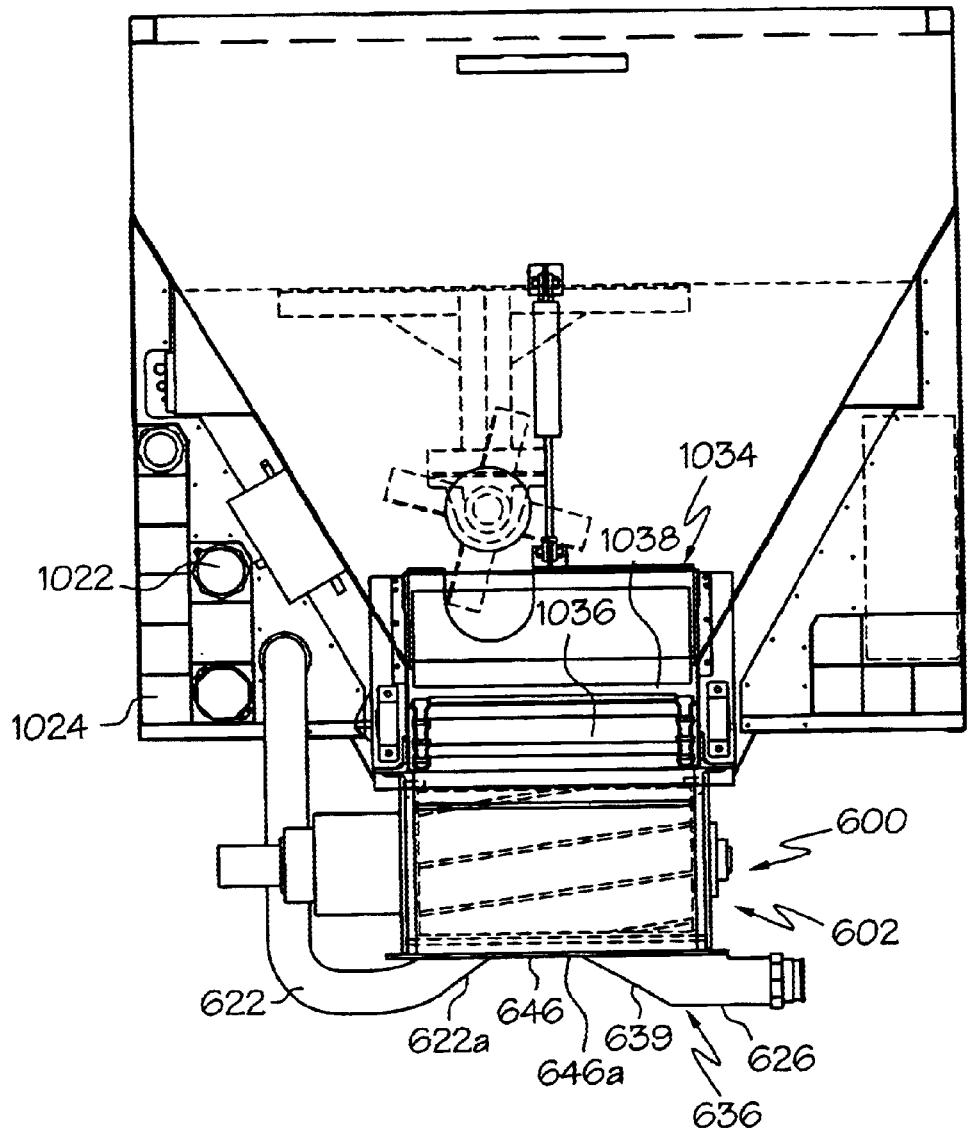
FIG. 10 is a rear elevational end view of the bulk material discharge assembly of FIG. 8 and including a discharge assembly as shown in FIG. 7 in accordance with the present invention.

When dispensing bulk material, a conduit or pipe, e.g., one or more discharging conduits 1022 may be removed from storage spaces, e.g., storage spaces 1024 as shown in FIG. 10. A distal end portion of the discharge conduit 1022 may be connected to the outlet conduit 626 in order to properly direct and discharge the bulk material. Additional discharge conduits 1022 may be linked in series to effectively lengthen the discharge conduit. A plurality of spaces 1024 may be provided to store different sized or a plurality of similarly sized discharge conduits 1022. In addition, or alternatively, a storage spool 1027, as shown in FIG. 8, may be provided in order to store additional discharge conduits.

The engine 1014 powers a pump that provides a flow of hydraulic fluid from the hydraulic tank 1018 which operates certain functions of the bulk material discharge assembly 1000. For example, the bulk material discharge assembly 1000 may be provided with an agitator 1026 as best shown in FIG. 9 which encourages material to travel from the rear 1028 of the hopper 1012 to the front 1030 of the hopper 1012. The bulk material discharge assembly 1000 may further include a floor conveyor 1032 that encourages movement of the bulk material from the front 1030 of the hopper 1012 to the rear 1028 of the hopper 1012, towards the discharge assembly 600.

The bulk material discharge assembly 1000 may further include a vertically operating discharge gate 1034, as shown in FIG. 10, to control the feed of bulk material through a hopper opening 1038. The bulk material discharge assembly may further include a feed roll 1036 as shown in FIG. 10. The feed roll 1036 encourages and controls the consistent flow of bulk material entering into the airlock, for instance, into the airlock material inlet 612 of the airlock 600.

The discharge apparatus according to the invention is adapted to connect to and cover an airlock material outlet, for example, of an airlock 600. The discharge apparatus comprises an air outlet adapted to at least substantially direct an airstream through an airlock material outlet and toward an interior area defined by an airlock, a material-directing trough adapted to receive an airstream and bulk material entrained therein from the airlock, and an extension member adapted to at least partially define a path of an airstream. In one embodiment, the extension member extends along at least a portion of a length of a material conveying area of an airlock. In a further embodiment, the extension member is arranged in or adjacent a material outlet of an airlock.

Figure 1:
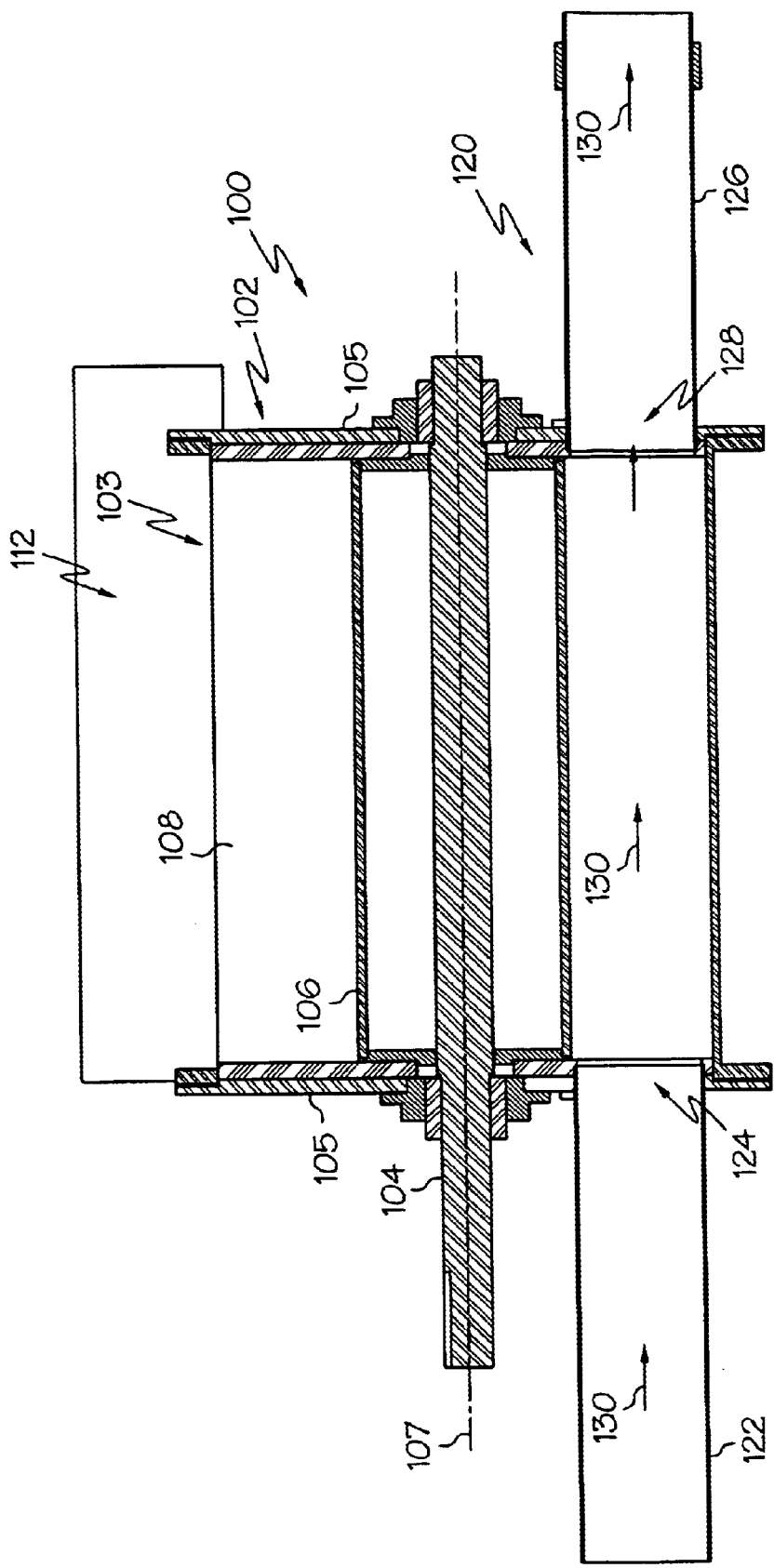
FIG. 1 is a cross-sectional view of one embodiment of a conventional airlock discharge assembly.
Figure 2:
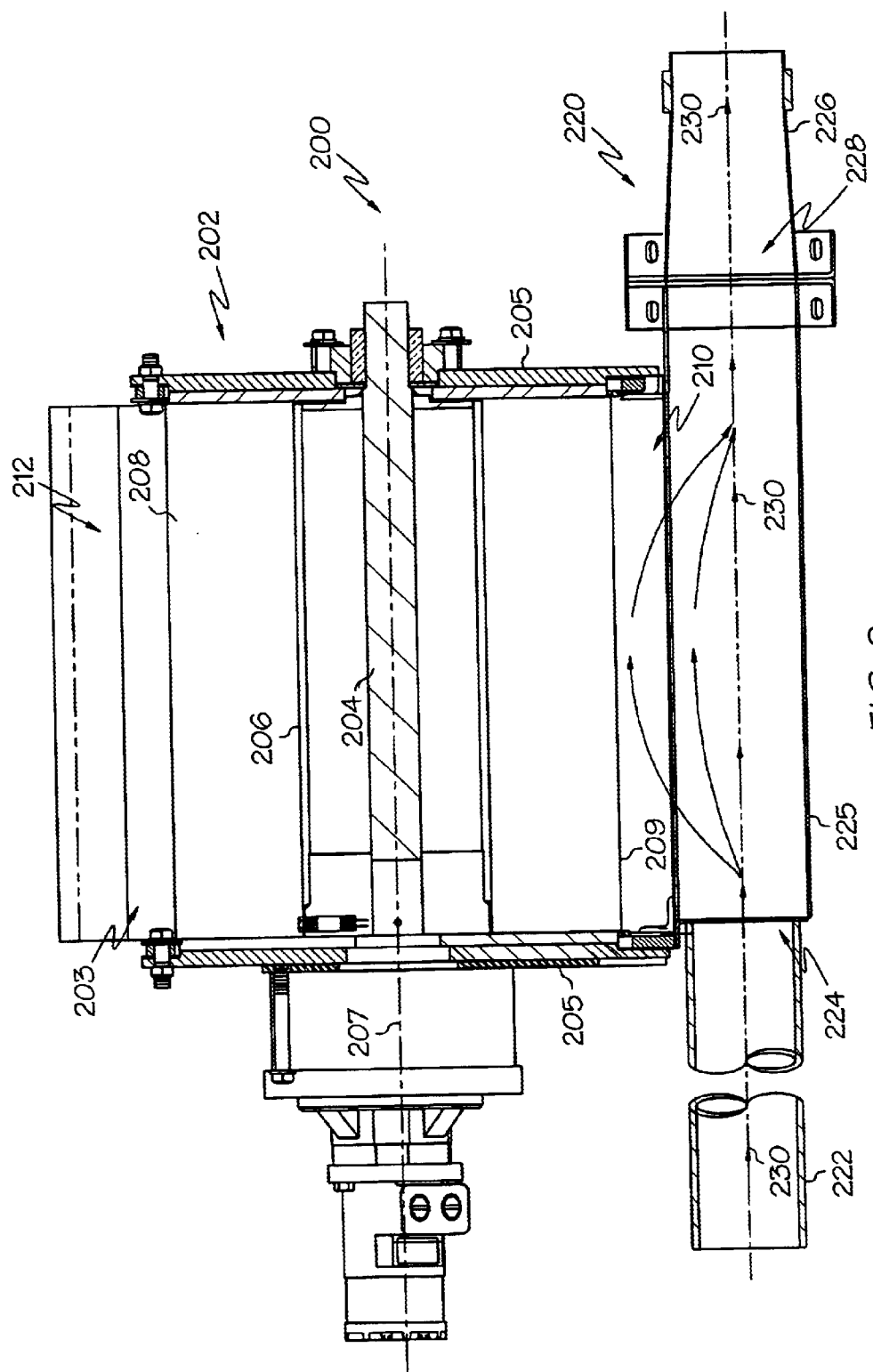
FIG. 2 is a cross-sectional view of another conventional airlock discharge assembly.
Figure 3:
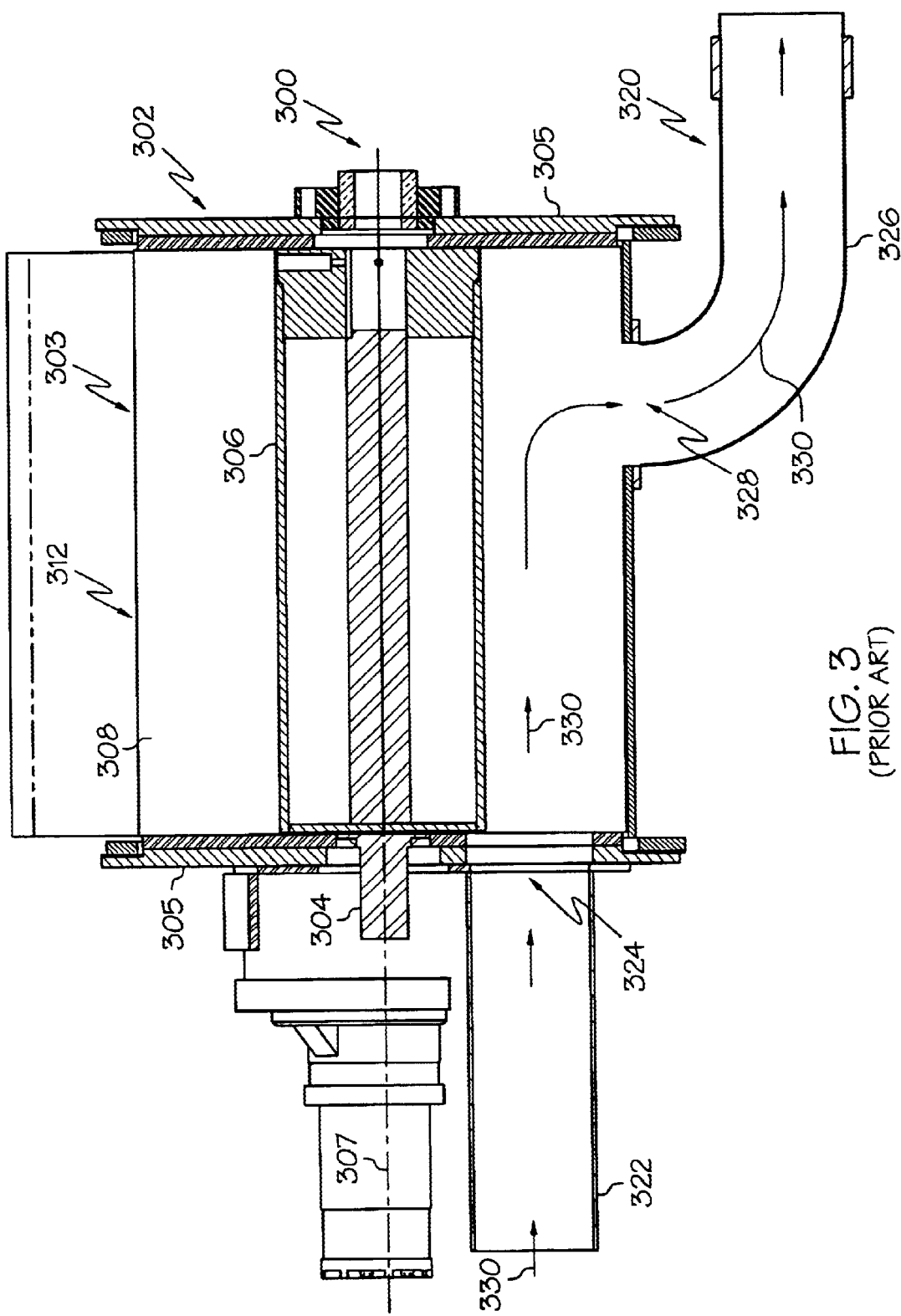
FIG. 3 is a cross-sectional view of yet another conventional airlock discharge assembly.
Figure 4:
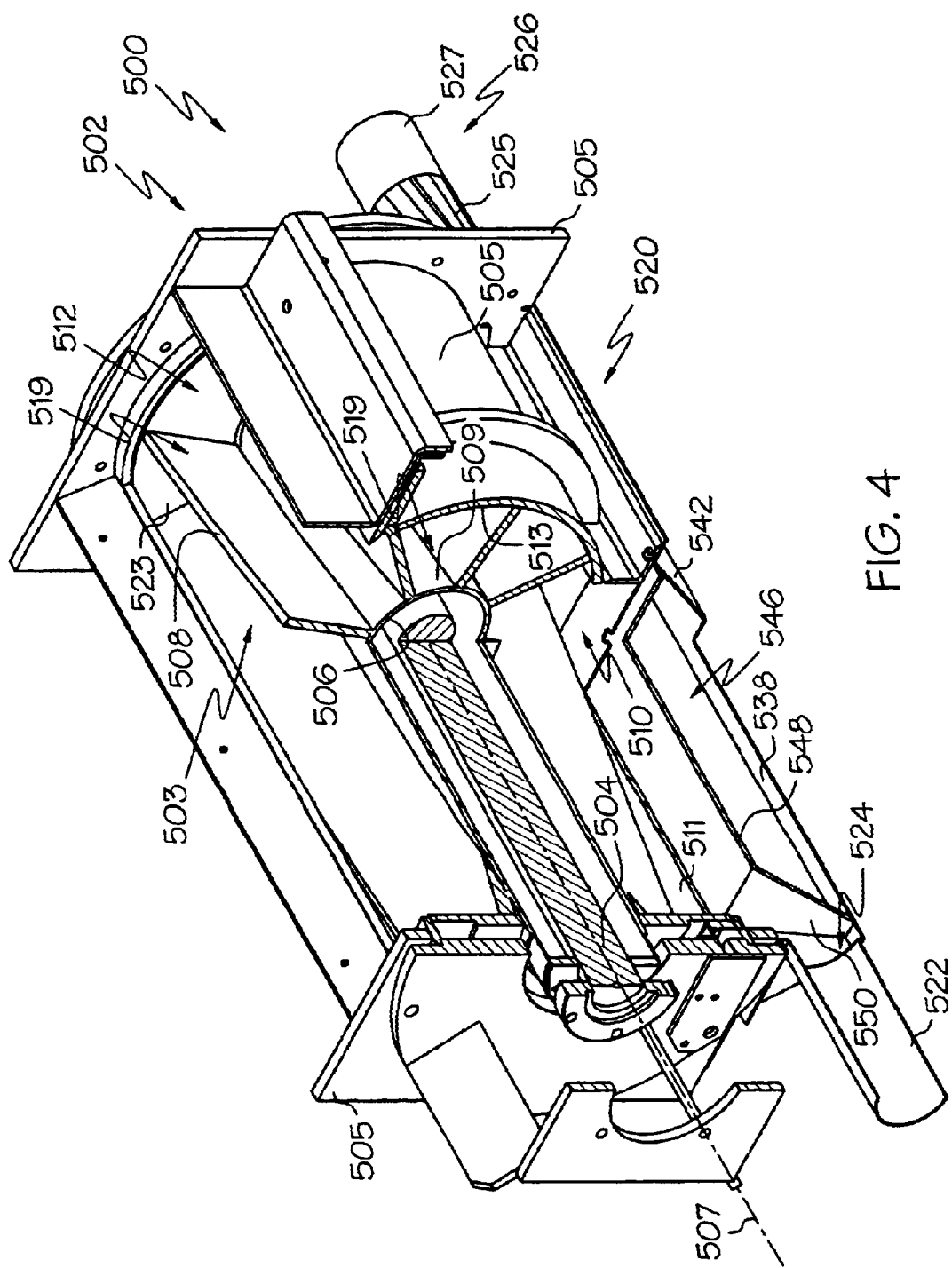
FIG. 4 is a partial sectional perspective view of one exemplary embodiment of the air lock discharge assembly in accordance with the present invention.
Figure 5:
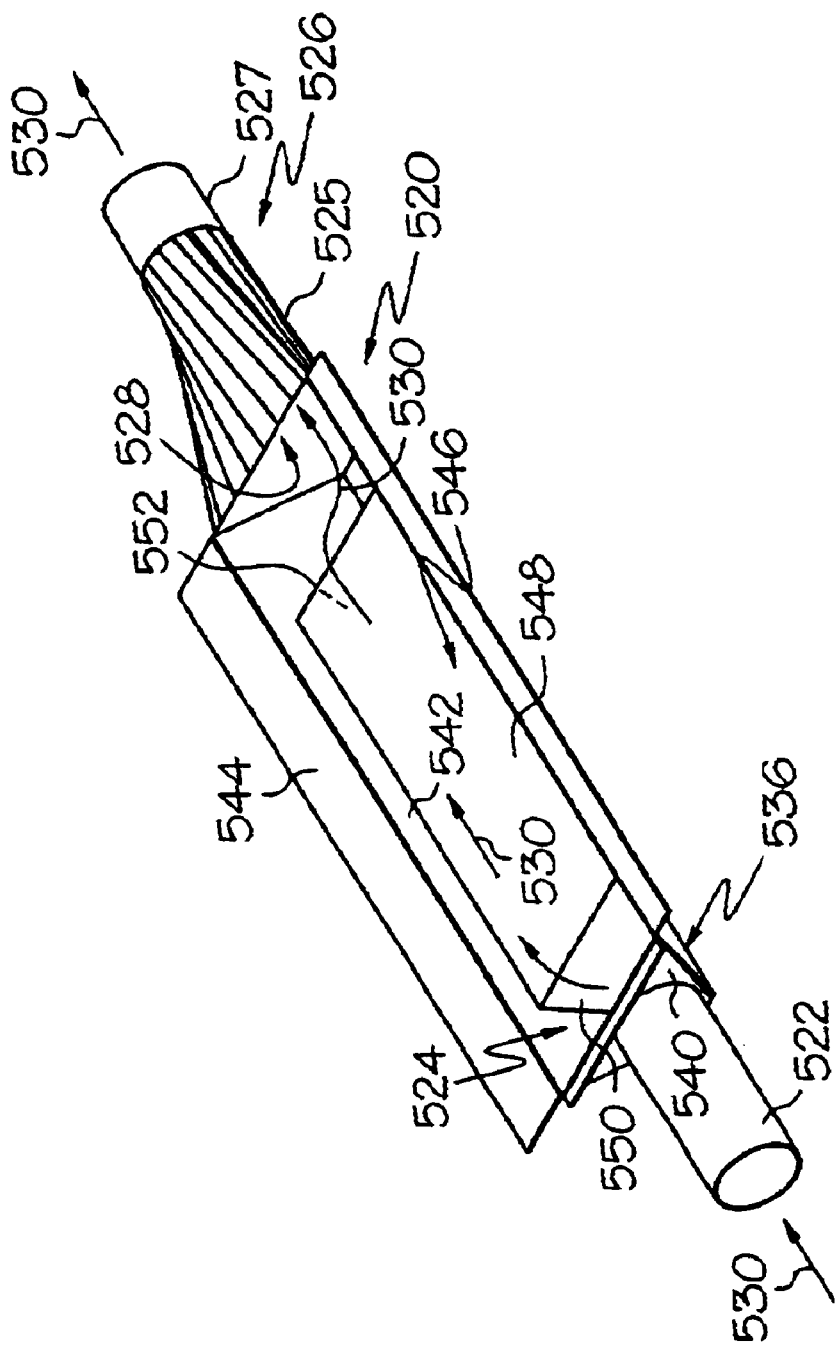
FIG. 5 is a perspective view of the discharge apparatus of the airlock discharge assembly illustrated in FIG. 4.

FIGS. 4 and 5 depict one exemplary embodiment of an airlock discharge assembly 500 for use with a bulk material discharge assembly 1000. The airlock discharge assembly 500 includes an airlock 502, such as a rotary airlock, and a discharge apparatus 520.

The airlock 502 typically includes a rotor 503 rotatably mounted in a housing 505. The rotor 503 comprises an axle 504 having an axis 507, and a hub 506 coupled to the axle 504 for rotation relative to the housing 505. One or more vanes 508 are typically attached to an outer circumferential surface 509 of the hub 506 such that they extend radially from the hub 506. The vanes 508 may take the form of tines, brushes, blades, paddles, or the like. The airlock 502 is provided with a material inlet 512 and a material outlet 510. Typically, the material outlet 510 is a dropout outlet.

In one example, bulk material conveying areas 519 are defined by pairs of adjacent vanes 508, respectively. The bulk material conveying areas 519 may be further defined by a portion of the outer surface 509 of the hub 506, and an inner surface portion 513 of the housing 505. The bulk material conveying areas may be yet further defined by a side wall portion 523 of the housing 505, or alternatively, by end plates extending between the vanes 508. Inclusion of end plates may reduce wear of the housing 505 by preventing frictional contact between the bulk material and the side wall 523 of the housing 505 as the rotor 503 rotates about the axis 507. As shown in FIG. 4, the airlock 502 includes a plurality of vanes 508 defining a plurality of bulk material conveying areas 519. Alternatively, the airlock 502 may include one vane 508 defining a single bulk material conveying area 519.

One embodiment of a discharge apparatus is illustrated in FIG. 5 The exemplary discharge apparatus 520 includes a trough 536 provided with an extension member 546 arranged therein. As shown in FIG. 5, the extension member effectively raises the bottom of the trough 536 in a portion of the trough. For instance, the extension member 546 may raise the bottom of the trough from about 2 to 6 inches. In another embodiment, the extension member 546 may raise the bottom of the trough from about 3 to 5 inches. In yet another embodiment, the extension member 546 may raise the trough about 4 inches. In one embodiment, the extension member 546 is offset from the bottom of the trough such that the extension member 546 is adapted to be positioned within an interior portion of the airlock discharge assembly 500.

The extension member 546 is adapted to influence the path of an airstream and reduce a combined cross-sectional area defined by the airlock material outlet 510 and the trough 536. The extension member 546 may take any form that effectively raises the bottom wall of the trough 536. For instance, the extension member 546 may take the form of a thin sheet member including a top wall 548 typically spaced from a bottom portion 538 of the trough 536 as best illustrated in FIG. 4. The extension member 546 may also include an inlet end wall 550 and an outlet end wall 552. In one embodiment, the end walls 550, 552, as shown in FIGS. 4 and 5 each extend at an angle from the top wall 548 toward the bottom portion 538 of the trough 536 to assist in directing an airstream relative to the discharge apparatus as will be discussed in further detail below. The angles may be the same or different from one another. In one embodiment, each end wall extends outwardly and away from the top wall 548 at identical inclinations.

As shown in FIG. 4, the extension member 546 may be formed from thin, rigid material. Alternatively, the extension member 546 may be formed from a thick material or from a solid block disposed, mounted, attached or integrally formed within the trough 536.

The discharge apparatus 520 may be provided with one or more troughs 536. In one exemplary embodiment, as shown in FIGS. 4 and 5, the trough 536 may be formed separately from the extension member 546. The extension member 546 may then be disposed, mounted, attached or integrally formed with the trough 536 to effectively raise the bottom wall of the trough as discussed above. For instance, attachment may be provided by a snapping connection, an interference fit, welding, gluing or otherwise attaching the extension member 546 within the trough 536.

The discharge apparatus 520 may alternatively be formed with one or more extension members 546 in combination with a plurality of troughs. For instance, two troughs may be connected together to form the discharge apparatus 520, with or without the portions of the trough material located under the top wall 548 of the extension member 546 and between the end walls 550, 552. Removing, or failing to provide portions of the trough 536 located under the top wall 548 and between the inlet end wall 550 and the outlet end wall 552, would save material and reduce the weight of the airlock discharge assembly 500.

The trough 536 may include a trough sidewall 542 or a plurality of trough sidewalls 542 as shown in FIGS. 4 and 5. The trough 536 may also be formed without sidewalls. The trough 536 may further be formed with or without an inlet trough wall 540. As shown in FIG. 5, the trough may be formed without an outlet end wall and, rather, connect directly to a discharging connecter 525 of an outlet conduit 526. Alternatively, the trough may be provided with an outlet end wall provided with an aperture or opening.

As further shown in FIGS. 4 and 5, an inlet conduit 522 may be attached to the inlet trough wall 540. In one embodiment, an air inlet 524 may be defined by the inlet end wall 550 of the extension member 546 and a portion of the trough 536. The air inlet 524 may be further defined by the inlet conduit 522 and the inlet trough wall 540. An outlet conduit 526 may be attached to the opposite end of the trough 536. The outlet conduit 526 may be formed with a substantially constant cross section throughout its length. However, to facilitate delivery of bulk material, as shown in FIGS. 4 and 5, the outlet conduit 526 may include a tapered discharging connector 525 that may funnel or continue to funnel and increase the velocity of the bulk material entering the outlet conduit 526. The outlet conduit 526 may optionally further include a conduit with a substantially constant cross section 527 for discharging the bulk material to a desired location.

The trough 536 may also comprise upper flanges 544 for attaching the discharge apparatus 520 to the airlock 502. The discharge apparatus 520 may be attached with screws, rivets, fasteners, vibration dampening fasteners, adhesives, welding, or otherwise attached. Alternatively, the flanges 544 may be part of the housing 505 of the airlock 502.

In use, bulk material is fed into the airlock discharge assembly 500 through the airlock material inlet 512. The bulk material enters and at least partially fills one or more of the bulk material conveying area(s) 519. The bulk material is conveyed by rotating with the rotor 503 about the axis 507 until the bulk material conveying area(s) 519 are registered with the airlock material outlet 510. An airstream 530 enters the inlet conduit 522 and is directed by the air inlet 524 through the airlock material outlet 510 and toward an interior area (e.g., the bulk material conveying area(s) 519 which are in communication with the outlet 510) of the airlock 502. The bulk material located in the bulk material conveying area(s) 519 may be immediately entrained in the airstream 530. Portions of the bulk material may also fall from the bulk material conveying area(s) 519 into the airlock material outlet 510 and then become entrained in airstream 530. In one application, a majority of the bulk material is entrained in the airstream 530 as the airstream passes through the bulk material conveying area. The airstream 530, with the bulk material entrained therein, then exits the bulk material conveying area(s) 519, as will be described in further detail below.

As illustrated in FIGS. 4 and 5, the air inlet 524 is adapted to at least substantially direct an airstream 530 through an airlock material outlet 510 and toward an interior area (e.g., bulk material conveying area(s) 519) defined by the airlock 502. In one exemplary embodiment, the air inlet 524 is further adapted to direct a majority of the airstream into a first area 511 of a bulk material conveying area 519. The bulk material is entrained in the fluid flow as the airstream 530 travels within the air lock 502 and the trough 536. As the airstream 530 exits the outlet 510, it directs the material back down into the trough 536 and then into the outlet conduit 526. In one example, the outlet conduit includes the tapered discharging connector 525 connected to the conduit 527 having a substantially constant cross-section. The tapered discharging connector 525 funnels or continues to funnel the bulk material into a smaller cross-sectional area, thereby increasing the velocity of the airstream 530 and bulk material entrained therein. The inlet end wall 550 and the outlet end wall 552 may be provided to block off a portion of the trough, thereby forcing the material to travel over the top wall 548. If provided, the end walls 550, 552 may be angularly oriented relative to the top wall 548 such that they form trapezoidal inclines to allow the airstream and any bulk material entrained therein to ramp up through the airlock material outlet 510 and toward an interior portion (e.g., the bulk material conveying area(s) 519) of the airlock 502. Furthermore, the extension member 546 may be offset in the trough 536 such that the inlet end wall 550 is closer to the air inlet 524 than the outlet end wall 552 relative to the air outlet 528. Offsetting the extension member 546 provides more area at the outlet end of the discharge apparatus 520 thereby helping to prevent occlusion.

Figure 6:
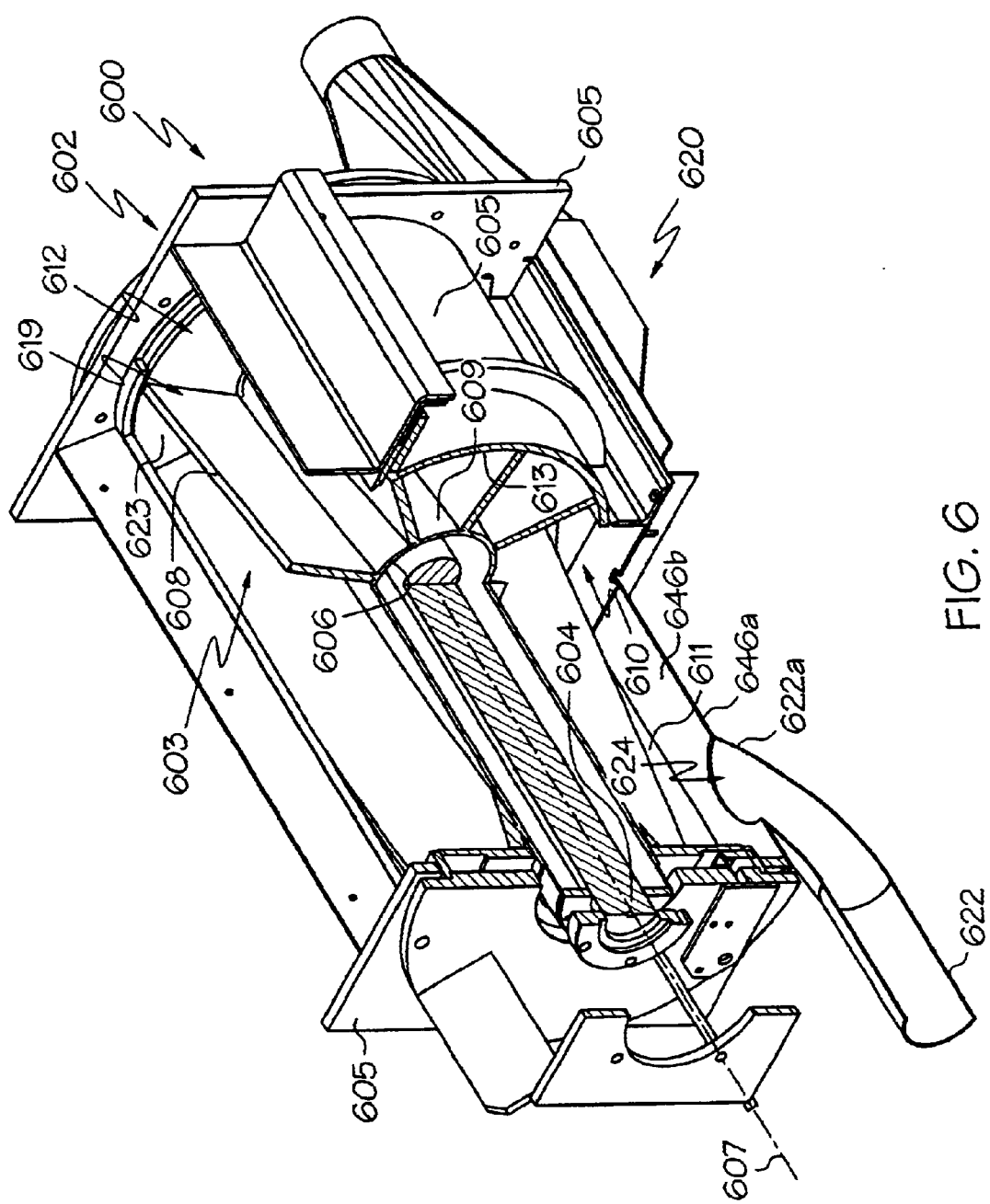
FIG. 6 is a partial sectional perspective view of another exemplary embodiment of an airlock discharge assembly in accordance with the present invention.
Figure 7:
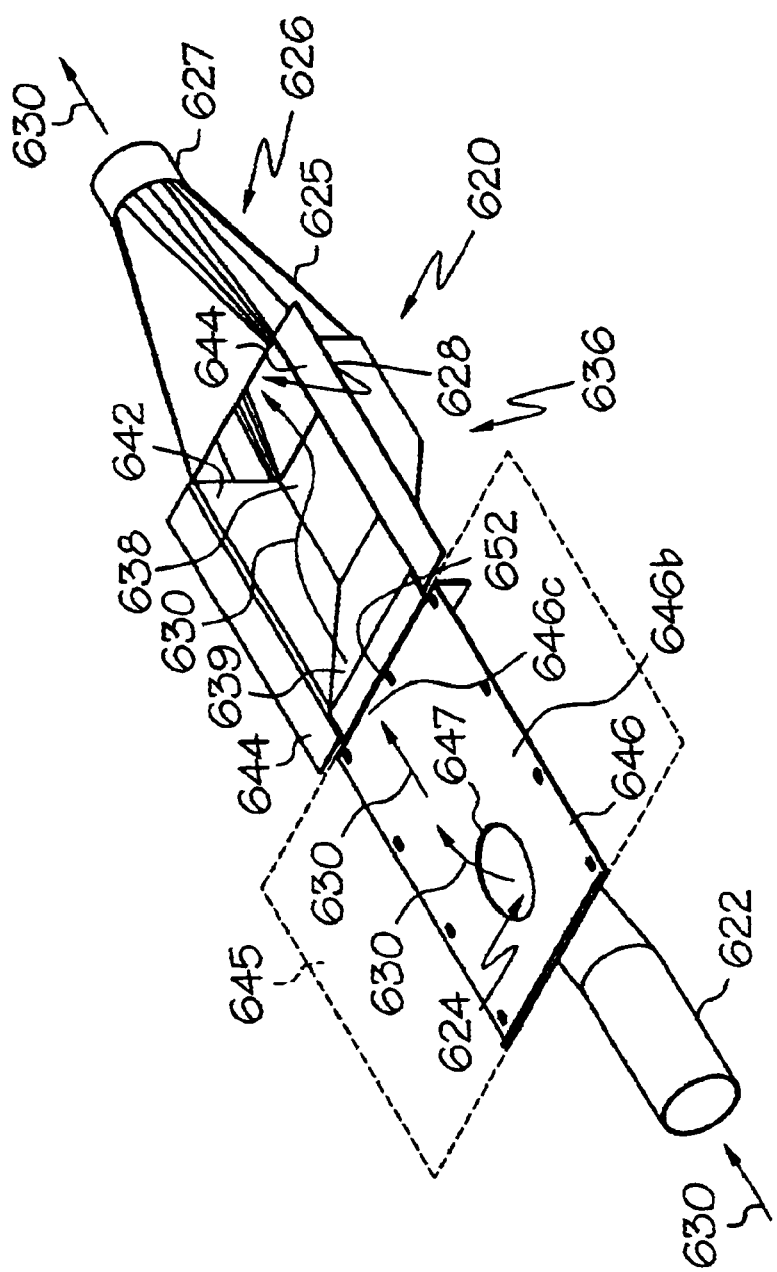
FIG. 7 is a perspective view of a discharge apparatus of the airlock discharge assembly as shown in FIG. 6.

FIGS. 6 and 7 depict another exemplary embodiment of an airlock discharge assembly 600 for use with a bulk material discharge assembly 1000. The airlock discharge assembly 600 comprises an airlock 602, such as a rotary airlock, and a discharge apparatus 620. The airlock 602 is similar to the airlock 502 in that it comprises a rotor 603 including an axle 604 having an axis 607 with a hub 606 disposed on the axle 604. The rotor 603 may include one or more vanes 608 attached to an outer surface 609 of the hub 606 and extending radially from the hub 606. As in the embodiment of FIGS. 4 and 5, vanes 608 may take the form of tines, brushes, blades, paddles, or the like.

In one example, similar to the embodiment of FIGS. 4 and 5, bulk material conveying areas 619 are defined by a pair of vanes 608, and may also be defined by a portion of the outer surface 609 of the hub 606, and an inner surface portion 613 of the housing 605. The bulk material conveying areas 619 may be yet further defined by a side wall portion 623 of the housing 605, or alternatively, by end plates or members extending between the vanes 608. Inclusion of end plates may reduce wear of the housing 605 by preventing frictional contact between the bulk material and the side wall 623 of the housing 605 as the rotor 603 rotates about the axis 607. The airlock 602 may include one vane 608 defining a single bulk conveying area 619. Alternatively, as shown in FIG. 6, the airlock 602 may include a plurality of vanes 608 defining a plurality of bulk material conveying areas 619.

The discharge apparatus 620 includes an extension member 646. In one embodiment, the extension member 646 may be a portion of the housing 605 of the airlock 602. Alternatively, the extension member 646 may be formed separately from the airlock 602 and attached to the airlock 602 by any suitable connector, including, but not limited to rivets, bolts, screws, glue, or welding.

In one embodiment, the extension member 646 may take the form of a plate or other member which is not an integral portion of the housing 605. For example, as shown in FIGS. 6 and 7, the plate can extend substantially along an extension plane 645. As shown, the plate can include a first side 646a facing away from the axle 604 and a second side 646b facing toward the axle 604. The plate can also include and end 646c that is attached to the material-directing trough 636. The extension member 646 may also be provided with an aperture 647 in fluid communication with an inlet conduit 622. For example, as best shown in FIGS. 6, 7 and 10, an end 622a of the inlet conduit 622 is positioned adjacent the first side 646a of the plate such that the inlet conduit 622 is in fluid communication with the aperture 647. An airstream 630 can therefore pass through the aperture 647 from the first side 646a to the second side 646b of the plate. The aperture 647 in combination with the inlet conduit 622 form an air inlet 624 which directs an airstream 630 at least substantially through an airlock material outlet 610 and toward an interior area (e.g., bulk material conveying area(s) 619) defined by the airlock 602. The airstream 630 with bulk material entrained therein travels within the interior portion of the airlock 602 until it encounters the end trough 636.

The end trough 636 is connected to the extension member 646 by any suitable connector(s). In one embodiment, the end trough 636 is pivotally connected to the extension member 646 via a hinge 652. The hinge 652 may be formed as a living hinge such as a single or multiple piece(s) of flexible plastic fabric, metal, or other material, or may be formed as a leaf hinge or the like. Allowing relative pivoting between the extension member 646 and the end trough 636 permits the end trough 636 to be rotated away from the airlock 602, thereby allowing maintenance of the interior of the airlock discharge assembly 600. For instance, bulk material that is lodged or clogged in the air outlet 628 could be easily removed by rotating the end trough 636 to an open position.

The end trough 636 may include one or more walls. In one embodiment, the end trough 636 may include end wall 639, for example, positioned at an acute angle with respect to the plane of the extension member 646 to prevent accumulation of portions of the bulk material in stagnant areas of the end trough 636. The end trough 636 may further comprise at least one trough side wall 642, for instance, two opposing sidewalls 642 as shown in FIG. 7. A bottom wall 638 may further be provided to extend between the trough end wall 639 and the air outlet 628. In one embodiment, an outlet conduit 626 is attached to the trough side wall(s) 642 and the bottom portion 638.

In one particular embodiment, the end wall 639 is angled to optimize the air flow relative to the discharge apparatus and thereby optimize the distribution of bulk material. The outlet end wall 552 of the discharge apparatus 520 may be angled in a similar manner. FIG. 7a illustrates the discharge apparatus 620 arranged relative to a sidewall of the housing 605 of the airlock 602. An exemplary plane 658 represents the effective area within the airlock 602 oriented in a direction perpendicular to the airstream 630. The plane 658 typically remains substantially constant until it reaches the point of deviation 660. At this point, the effective area is continually or substantially continually reduced until it reaches the conduit 627 having a constant cross section. In one example, the effective area of the plane 658 adjacent the air inlet 624 is approximately 65 square inches and remains approximately 65 square inches along the extension member 646 until reaching the point of deviation 660.

Once the point of deviation 660 is reached, the effective area of the airflow is reduced, for instance continuously or substantially continuously reduced, from the point of deviation 660 until the airflow reaches the air outlet 628. In this region, the effective areas of the planes perpendicular to the flow are defined by the ramped trough end wall 639, the bottom portion, the sidewall of the housing 605 portions of the rotor 603, and other portions of the housing 605. Once the airstream passes through the air outlet 628, the tapered discharging connector 625 continues to gradually reduce the flow area perpendicular to the airstream until reaching the conduit 627 with contact cross section. The conduit 627 may have a cross-sectional area of about 20 square inches.

Gradual reduction of cross-sectional areas is desirable to assist in imparting energy to the bulk material and to prevent settling of portions of the bulk material. The gradual reduction of area gradually increases the velocity of the entrained material which reduces conduit pulsation and material buildup. The embodiment of the airlock discharge assembly 500 also gradually reduces area and therefore increases the velocity in a similar manner.

In an embodiment having an end trough 636 that pivots relative to the extension member 646, a latch may be provided on the flanges 644, or elsewhere, to allow selective disengagement of the flanges 644 from the housing 605 of the airlock 602.

In use, bulk material is fed into the airlock discharge assembly 600 through the airlock material inlet 612. The bulk material enters and at least partially fills one or more of the bulk material conveying area(s) 619 and is then conveyed by rotating with the rotor 603 until the bulk material conveying area(s) 619 are registered with the airlock material outlet 610. The bulk material located in the bulk material conveying area(s) 619 may be immediately entrained in the airstream 630. Portions of the bulk material may also fall from the bulk material conveying area(s) 619 into the airlock material outlet 610 and then become entrained in the airstream 630. In one application, a majority of the bulk material is entrained in the airstream 630 as the airstream passes through the bulk material conveying area. The airstream 630, with the bulk material entrained therein then exits the bulk material conveying area(s) 619 as described more fully below.

As illustrated in FIGS. 6 and 7, the air inlet 624 is adapted to at least substantially direct an airstream through the airlock material outlet 610 and toward an interior area (e.g., bulk material conveying area(s) 619) defined by the airlock 602. On one embodiment, the air inlet 624 is also adapted to direct a majority of the airstream into a first area 611 of the bulk material conveying area 619. In another embodiment, the air inlet 624 directs the airstream at essentially a right angle relative to the axle 607 of the airlock 602. The bulk material is entrained in the fluid flow as the airstream 630 travels within the air lock 602. The airstream 630 directs the material along the length of the extension member 646 and then drops into the end trough 636. The airstream 630 further carries the material into the outlet conduit 626. Similar to the embodiments of FIGS. 4 and 5, the outlet conduit includes a tapered discharging connector 625 connected to the conduit 627 having a substantially constant cross-section. The tapered discharging connector continues to funnel the airstream 630, with the bulk material entrained therein, into a smaller cross-sectional area, thereby increasing the velocity of the airstream 630 as described more fully above.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

What is claimed is:

1. An airlock discharge assembly, comprising:
   a) a rotary airlock comprising a housing having a bulk material inlet and a bulk material outlet, a central axle within the housing and a plurality of vanes extending in a direction away from the central axle, wherein adjacent vanes define bulk material conveying areas within the housing, and wherein the bulk material conveying areas are adapted to register with the bulk material outlet;
   b) a material-directing trough in communication with the bulk material outlet and adapted to receive an airstream and bulk material entrained therein;
   c) an extension member including a plate extending at least substantially along an extension plane, wherein the plate includes an end attached to the material-directing trough and is adapted to at least partially define a path of an airstream, the plate including a first side facing away from the axle and a second side facing toward the axle, and the plate is provided with an aperture that extends through the plate from the first side of the plate to the second side of the plate; and
   d) an inlet conduit including an end positioned adjacent the first side of the plate and in fluid communication with the aperture such that an airstream passes through the aperture from the first side of the plate to the second side of the plate; wherein the aperture in combination with the inlet conduit form an air inlet in communication with the housing and adapted to at least substantially direct an airstream in a direction nonparallel to the axle and toward a bulk material conveying area in communication with the bulk material outlet.

2. The airlock discharge assembly of claim 1, wherein the plate comprises a portion of the housing and extends between the air inlet and the materia-directing trough.

3. The airlock discharge assembly of claim 2, wherein the material-directing trough includes a trough end wall extending at an angle from the portion of the housing and wherein the airlock discharge assembly further comprises an outlet conduit connected at an end of the material-directing trough opposite the trough end wall.

4. The airlock discharge assembly of claim 1, wherein the air inlet is adapted to direct a majority of an airstream into a first area of the bulk material conveying area and the material-directing trough is adapted to receive an airstream with bulk material entrained therein from a second area of the bulk material conveying area.

5. The airlock discharge assembly of claim 4, wherein the first area and the second area are at opposite end portions of the bulk material conveying area.

6. The airlock discharge assembly of claim 1, further comprising an outlet conduit attached to the material-directing trough, the outlet conduit including a tapered discharging connector adapted to funnel bulk material.

7. The airlock discharge assembly of claim 1, wherein the air inlet is adapted to direct a majority of an airstream into the bulk material conveying area in a direction substantially toward the central axle.

8. The airlock discharge assembly of claim 1, wherein the airlock discharge assembly is included as part of a bulk material discharge assembly comprising a hopper defining an interior for storing bulk material, the hopper being provided with a hopper opening, and wherein the bulk material inlet is adapted to receive bulk material from the interior of the hopper.

9. The airlock discharge assembly of claim 1, wherein the end of the plate is pivotally attached to the material-directing trough.

10. The airlock discharge assembly of claim 1, further comprising an outlet conduit, wherein one end of the material-directing trough is attached to the outlet conduit.

11. An airlock discharge assembly, comprising:
    a) a rotary airlock comprising a housing including an upper end and a lower end, a bulk material inlet located adjacent the upper end and a bulk material outlet located adjacent the lower end, a central axle within the housing and a plurality of vanes extending in a direction away from the central axle, wherein adjacent vanes define bulk material conveying areas within the housing, wherein the bulk material conveying areas are adapted to register with the bulk material outlet to discharge all material and air received by the rotary airlock through the bulk material outlet located adjacent the lower end in use;
    b) a material-directing trough in communication with the bulk material outlet for receiving bulk material from the bulk material conveying areas as they register with the bulk material outlet;
    c) an inlet conduit for introducing an airstream to the airlock discharge assembly; and
    d) an air inlet in communication with the housing and adapted to direct the entire airstream from the inlet conduit in a direction nonparallel to the axle and toward a bulk material conveying area in communication with the bulk material outlet.

12. The airlock discharge assembly of claim 11, further comprising an extension member adapted to at least partially define a path of an airstream.

13. The airlock discharge assembly of claim 12, wherein the extension member is disposed in the material-directing trough.

14. The airlock discharge assembly of claim 13, wherein the extension member comprises a top wall spaced from a bottom portion of the material-directing trough, an inlet end wall and an outlet end wall, each of the end walls being attached at corresponding end portions of the top wall and extending toward the bottom portion.

15. The airlock discharge assembly of claim 14, wherein each of the end walls extends at an angle from the top wall of the extension member toward the bottom portion of the material-directing trough.

16. The airlock discharge assembly of claim 14, wherein the air inlet is defined by the inlet end wall of the extension member and a portion of the material-directing trough.

17. The airlock discharge assembly of claim 16, wherein the air inlet is further defined by an inlet conduit and an inlet trough wall.

18. The airlock discharge assembly of claim 12, wherein the extension member extends between the air inlet and the material-directing trough.

19. The airlock discharge assembly of claim 12, wherein the extension member comprises a plate.

20. The airlock discharge assembly of claim 19, wherein the material-directing trough is attached to one end of the plate.

21. The airlock discharge assembly of claim 20, wherein the end of the plate is pivotally attached to the material-directing trough.

22. The airlock discharge assembly of claim 12, further comprising an outlet conduit, wherein one end of the material-directing trough is attached to the outlet conduit.

23. The airlock discharge assembly of claim 11, wherein the airlock discharge assembly is included as part of a bulk material discharge assembly comprising a hopper defining an interior for storing bulk material, the hopper being provided with a hopper opening, and wherein the bulk material inlet is adapted to receive bulk material from the interior of the hopper.

24. The airlock discharge assembly of claim 19, wherein the plate is provided with an aperture and wherein an inlet conduit is in fluid communication with the aperture.

25. An airlock discharge assembly, comprising:
a) a rotary airlock comprising a housing having a bulk material inlet and a bulk material outlet, a central axle within the housing and a plurality of vanes extending in a direction away from the central axle, wherein adjacent vanes define bulk material conveying areas within the housing, and wherein the bulk material conveying areas are adapted to register with the bulk material outlet;
b) an air inlet in communication with the housing and adapted to at least substantially direct an airstream in a direction nonparallel to the axle and toward a bulk material conveying area in communication with the bulk material outlet; and
c) a material-directing trough in communication with the bulk material outlet and adapted to receive an airstream and bulk material entrained therein, wherein the material-directing trough is pivotally attached to a portion of the discharge assembly.

26. The airlock discharge assembly of claim 25, wherein a plate extends between the air inlet and the material-directing trough.

27. The air discharge assembly of claim 26, wherein the material-directing trough is pivotally attached to the plate.

28. The airlock discharge assembly of claim 26, further comprising an inlet conduit, wherein the plate is provided with an aperture, wherein the inlet conduit is in fluid communication with the aperture, and wherein the air inlet is defined by the aperture and inlet conduit.

29. The airlock discharge assembly of claim 25, wherein the air inlet is adapted to direct a majority of an airstream into a first area of the bulk material conveying area and the material-directing trough is adapted to receive an airstream with bulk material entrained therein from a second area of the bulk material conveying area.

30. The airlock discharge assembly of claim 29, wherein the first area and the second area are at opposite end portions of the bulk material conveying area.

31. The airlock discharge assembly of claim 25, wherein the airlock discharge assembly is included as part of a bulk material discharge assembly comprising a hopper defining an interior for storing bulk material, the hopper being provided with a hopper opening, and wherein the bulk material inlet is adapted to receive bulk material from the interior of the hopper.

* * * * *